Oct. 11, 1927.
A. P. TREDWAY
1,645,464
GEAR SHIFT FOR MOTOR VEHICLES
Filed Feb. 4 1926    2 Sheets-Sheet 1
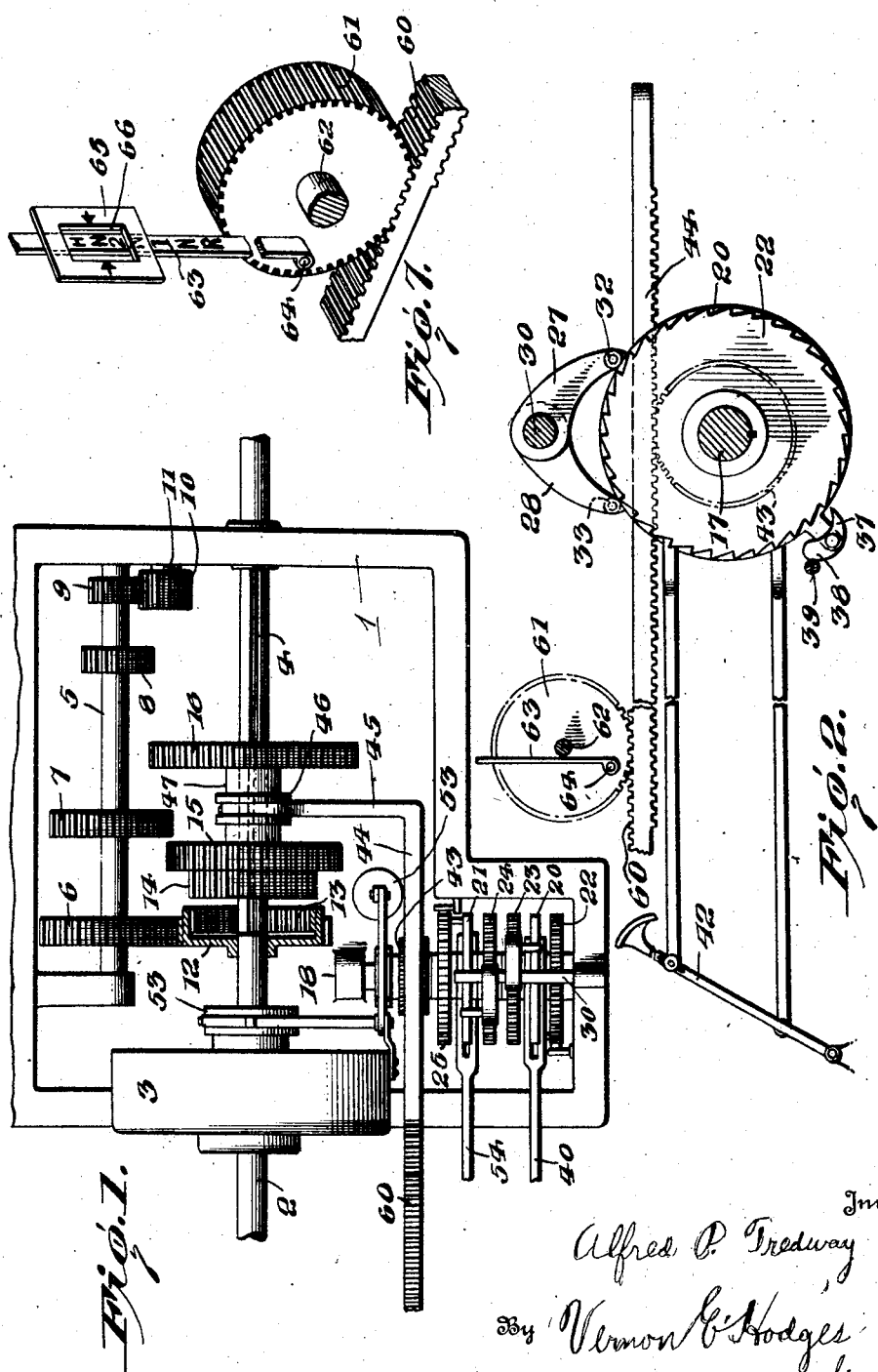
Inventor
Alfred P. Tredway
By Vernon C. Hodges
his Attorney Oct. 11, 1927.                    A. P. TREDWAY                    1,645,464
GEAR SHIFT FOR MOTOR VEHICLES
Filed Feb. 4 1926                                          2 Sheets-Sheet 2
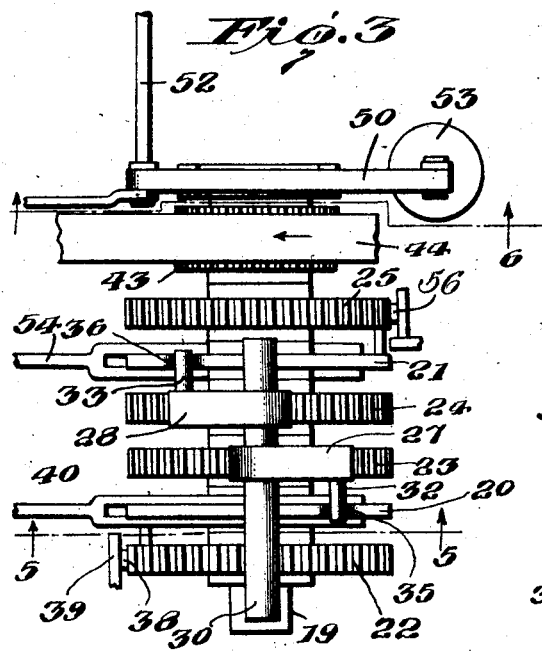
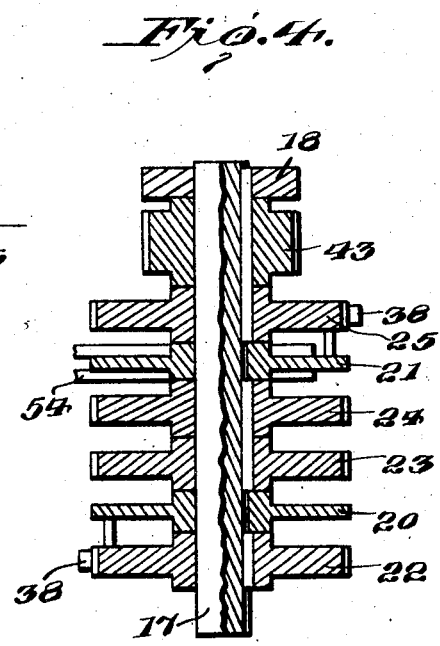
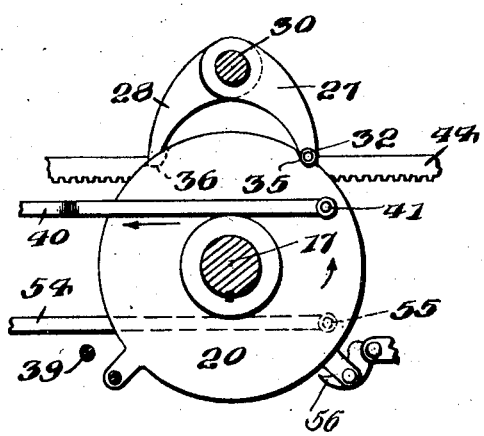
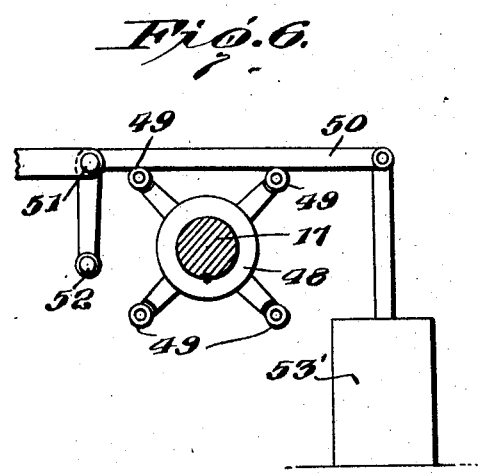
Inventor
Alfred P. Tredway
By Vernon E. Hodges
his Attorney Patented Oct. 11, 1927.

1,645,464

UNITED STATES PATENT OFFICE.

ALFRED P. TREDWAY, OF SHOALS, INDIANA.

GEAR SHIFT FOR MOTOR VEHICLES.

Application filed February 4, 1926. Serial No. 86,059.

My invention relates to an improvement in gear shifts for motor vehicles.

The object is to make all shifts with the foot-pedals, so that the operator of the vehicle will always have both hands free to steer the machine.

The machine includes, in addition to any ordinary gear-shift, an auxiliary mechanism operated directly by the two foot-pedals, one of which pedals is used for shifting the gears in one direction, and the other foot-pedal for shifting the gears in the opposite direction.

In the accompanying drawings:

Fig. 1 is a top plan view;

Fig. 2 is an enlarged detail of my improved mechanism partly in section;

Fig. 3 is an enlarged plan view of my improved mechanism;

Fig. 4 is a horizontal section through the same;

Fig. 5 is a section on the line 5—5 of Fig. 3;

Fig. 6 is a section on the line 6—6 of Fig. 3; and

Fig. 7 is a detail.

The numeral 1 represents a suitable framework; 2, is the drive-shaft from the engine; and 3 is any typical form of clutch; 4 is the driven-shaft extending to the rear; and 5 is the counter-shaft having keyed thereon the usual gear 6 for high speed, 7 for second, 8 for low, 9 for reverse, and 10 is an idle gear on the stub-shaft 11.

A gear 12 is secured to the drive shaft 2, with its teeth in engagement with the gear-wheel 6 on countershaft 5 for transmitting motion to the latter. Gear 12 has internal gear-teeth 13.

Keyed to slide on shaft 4 and turn with it are the usual gears 14, 15 and 16 of varying sizes, and the gear 14 is shifted to mesh with the internal gear teeth 13 in high gear, the intermediate size gear 15 to mesh with gear 7 in second, and the large gear 16 to mesh with gear 8 when in low, or with the idle gear 10 in reverse. All of the foregoing is a more or less typical form of gear-shift, and no claim to that mechanism is made.

But the means for shifting the gears 14, 15 and 16 on shaft 4, and controlling the clutch 3 constitutes my invention, and this I shall now proceed to describe in detail:—

A rock-shaft 17 is supported at opposite ends in suitable bearings 18 and 19. Two disks 20 and 21 are loosely mounted on this shaft, and ratchet-toothed wheels 22, 23, 24 and 25 are keyed on the auxiliary shaft 17 with their teeth alternately extending in opposite directions, two of these ratchet-toothed wheels 22 and 25 being arranged at the ends with their teeth extending in opposite directions, and two at the center between the disks 20 and 21, with their teeth extending in opposite directions from each other, as viewed in Figs. 3 and 4.

Gravity-locks 27 and 28 are pivotally mounted on the rod 30 directly above the center ratchet-wheels 23 and 24, and these gravity locks extend in opposite directions to correspond with the direction of the teeth on these two wheels. A roller 32 extends outwardly from the gravity-lock 27 in position to rest upon the periphery of the disk 20, and a corresponding roller 33 extends in the opposite direction from the free end of the gravity-lock 28, and rests upon the periphery of the disk 21. The disk 20 has a notch 35 in its periphery in position to receive the roller 32 when the disk is in its normal position, which permits the outer end of gravity-lock 27 to engage the teeth of the ratchet-toothed wheel 23.

In a similar way, the disk 21 has a notch 36 which normally is in position to receive the roller 33 of gravity-lock 28, as viewed in Figs. 3 and 5.

A pawl 37, pivotally supported on a lug at the lower edge of the disk 20, is in position to engage the teeth of wheel 22 when the disk 20 is turned in the direction of the arrow in Fig. 5, far enough for the weighted end 38 to clear the stop 39. A pedal rod 40 pivoted to the disk 20 at 41 extends to the left-hand foot-pedal 42, by means of which the rock-shaft 17 is turned in the direction of the arrow in Fig. 5 when the foot-pedal is lowered.

The gears 14, 15 and 16 are shifted by the following mechanism:

A pinion 43 is keyed at the inner end of shaft 17, so that it has the same limited turn that the shaft 17 receives. A rack-bar 44 operates in connection with this pinion and is moved endwise thereby. This rack-bar 44 terminates at the inner end in a spanner-arm 45 which engages the collar 46 on the sleeve 47 which carries the gears 14, 15 and 16. Shaft 17 also carries a star-whel 48, which has rollers 49 at the four points illustrated in Fig. 6. A bell-crank lever 50 is pivoted at 51 and rests over this star-wheel in contact all the time with either one or two of the rollers 49, as shown in Fig. 6, and the lower end 52 engages the collar 53 of the main clutch 3, as shown in Fig. 1. The clutch is normally "in" or engaged, when the parts are in the position shown in Fig. 6; but with any turn of the shaft 17, in the shifting of gears, one of the rollers 49 raises the lever 50 resting thereon to throw out or disengage the clutch automatically.

The clutch is thus held as long as the lever 50 is engaged by a single roller, but the moment the shaft 17 takes the position shown in Fig. 6, with two of the rollers in the same horizontal plane, the dash pot 53' draws the lever 50 slowly down into contact with the rollers, causing throwing the clutch in, or causing it to engage.

To shift the gears for driving forward, the operation is briefly as follows:

Assuming the shift-gears are in neutral, and the gear 16 is to the right of low gear 8, or at a position between gears 8 and 9. The downward pressure of the left-foot pulls the rod 40 to the left. This turns the disk 20 in the direction of the arrow (see Fig. 5), and the notch 35 from beneath the roller 32. This lifts the gravity lock 27 from the teeth of wheel 23. As the disk 20 turns further, the pawl 39 drops from the stop 37 and engages the teeth of ratchet-tooth wheel 22, thus turning the shaft 17, and with it the pinion 43, which imparts an endwise movement to the rack 44. This throws the gears 14, 15 and 16 to the left, for example to low gear, the clutch being simultaneously released through the operation of the star-wheel 48 against lever 50.

To move the gears to second, the operator lets the foot pedal back, and repeats the operation. As he lets it back, the disk 20 is reversed and returned to the position shown in Fig. 5, and when the notch 35 comes beneath the roller 32, the gravity lock 27 engages a tooth of the wheel 23, thus stopping the further backward movement of the shaft 17.

Shifting now from second to high, the operation is repeated.

To reverse, the right-hand foot-pedal is operated in the same way through the pedal-rod 54, which latter is pivotally connected with the lower portion of the disk 21, as indicated by the dotted lines in Fig. 5, the effect of which is to turn the disk 21 in the opposite direction from the initial turn of the disk 20 just described. This has the effect of forcing the roller 33 on the gravity-lock 28 out of the notch 36, thus lifting the lock away from the teeth of wheel 24, and immediately thereafter a pawl 56 pivoted on the disk 21 (and working like pawl 37, only just the opposite) engages the teeth of wheel 25, thereby turning the shaft 17 in the opposite direction.

All of these turns are approximately quarter-turns. The shaft 17 at most never makes more than a complete rotation, altogether dependent on the number of shifts in one direction. Four shifts would result in a complete intermittent revolution. With each quarter turn shift, the disk 21 is turned back until the notch 36 receives the roller 33 on gravity-lock 28, thus causing the lock to engage the teeth of wheel 24, thereby arresting any further turn of the shaft.

Thus we see the shifting in one direction is done by one foot-pedal, and in the reverse direction by the other; and all of the shifting of gears is done by the foot-pedals and not by the hand, as is now customary.

In this way the operator is free to use his hands for steering, and the control and operation of the car is thus greatly simplified.

It may be desirable to provide means for indicating to the driver, especially when the car is standing the position of the shift-gears. This might be done in various ways. A simple means is illustrated in Fig. 7, in which the rack-bar 44 is provided with teeth 60 on top at its forward end as shown in Figs. 1, 2 and 7. These teeth engage the teeth of a pinion 61 carried by shaft 62, and gauge-bar 63 is pivoted at 64 to the pinion, and this gauge-bar 63 is provided with letters and numerals, for instance H, N, 2, N, 1, N, R, to indicate "High", "Neutral", "Second", "Neutral", "First", "Neutral" and "Reverse" respectively. This bar slides through a slide 65, which has a window 66 therein in front of the driver, and the letter or numeral just opposite the arrows indicate the position of the shift-gears.

I claim:

1. In a gear shifting device of the character described, the combination of a movable gear, shifting means connected with and for moving the gear, means connected with the shifting means for moving the gear in one direction, and secondary means connected with the shifting means independently of the first-mentioned moving means for moving the gear in the opposite direction.

2. In a gear shifting device of the character described, the combination of a movable gear, shifting means connected with and for moving the gear, a foot pedal operatively connected with the shifting means for moving the gear in one direction, and a second foot pedal operatively connected with the shifting means for moving the gear in the opposite direction.

3. In a gear shifting device of the character described, the combination of a movable gear, a rock shaft connected with and for shifting said gear, a foot pedal connected with the rock shaft for moving said shaft to shift the gear in one direction, and a second foot pedal connected with said rock shaft to shift the gear in the opposite direction.

4. In a gear shifting device of the character described, the combination of a shiftable gear, a rock shaft connected with and for shifting said gear, a foot pedal connected with the rock shaft to shift the gear in one direction, a second foot pedal connected with said rock shaft independently of the first-mentioned pedal to shift the gear in the opposite direction, and means disconnecting either of said foot pedals from operative connection with the rock shaft upon operation thereof by the other.

5. In a gear shifting device of the character described, the combination of a shiftable gear, a rock-shaft connected with and for shifting said gear, a pedal, means connecting said pedal with the rock shaft for moving said rock shaft in one direction only, a second pedal, and secondary means for connecting said second pedal with the rock shaft for moving the rock shaft in the opposite direction only.

6. In a gear shifting device of the character described, the combination of a shiftable gear, a rock shaft connected with and for shifting said gear, a pedal, a pawl and ratchet connection between said pedal and rock shaft for moving the rock shaft in one direction, a second pedal, and a second pawl and ratchet connection between the second pedal and the rock shaft for moving the rock shaft in the opposite direction.

7. In a gear shifting device of the character described, the combination of a shiftable gear, a rock shaft connected with and for shifting the gear, ratchet wheels fixed on said rock shaft having the teeth thereof arranged in opposite directions, disks loosely mounted on the rock shaft, pawls carried by the disks for engaging the ratchet wheels, and pedals connected with the disks for moving the rock shaft to shift the gear.

8. In a gear shifting device of the character described, the combination of a shiftable gear, a rock shaft connected with and for shifting the gear, ratchet wheels fixed on said rock shaft having the teeth thereof arranged in opposite directions, disks loosely mounted on the rock shaft, pawls carried by the disks for engaging the ratchet wheels, pedals connected with the disks for moving the rock shaft to shift the gear, pawl and ratchet means to prevent back motion of the rock shaft, and means connected with the disks for moving said pawl and ratchet means out of operative connection with the rock shaft.

9. In a gear shifting device of the character described, the combination of a shiftable gear, a rockshaft connected with and for shifting the gear, means for operating the rockshaft, a main control clutch, a lever connected with and for operating the clutch, and a star-wheel fixed on the rockshaft and having rollers on the outer ends thereof in position to engage and actuate the lever.

10. In a gear shifting device of the character described, the combination of a shiftable gear, a rock shaft connected with and for shifting the gear, means for operating the rock shaft, a main control clutch, a bell crank lever connected with and for operating the clutch, a dash pot connected with said bell crank lever, and a star wheel fixed on the rock shaft having rollers fixed on the outer ends thereof in position to engage and actuate the bell crank lever.

11. In a gear shifting device of the character described, the combination of a shiftable gear, a rock shaft connected with and for shifting said gear, means operatively connected with the rock shaft for operating said rock shaft in one direction only, and secondary means operatively connected with the rock shaft for operating said rock shaft in the opposite direction only.

12. In a gear shifting device of the character described, the combination of a shiftable gear, a rock shaft connected with and for shifting the gear, ratchet wheels mounted on the rock shaft and having the teeth thereof arranged in opposite directions, pawls mounted in position to engage and operate the ratchet wheels, and means for actuating the pawls.

13. In a gear shifting device of the character described, the combination of a shiftable gear, a rock shaft connected with and for shifting the gear, ratchet wheels fixed on the rock shaft and having the teeth thereof arranged in opposite directions, pawls mounted in position to engage and actuate the ratchet wheels, and independent means for actuating the pawls for moving the rock shaft in opposite directions.

In testimony whereof I affix my signature.

ALFRED P. TREDWAY.